United States Patent
Bates et al.

(10) Patent No.: US 6,721,721 B1
(45) Date of Patent: Apr. 13, 2004

(54) VIRUS CHECKING AND REPORTING FOR COMPUTER DATABASE SEARCH RESULTS

(75) Inventors: Cary Lee Bates, Rochester, MN (US); Robert James Crenshaw, Apex, NC (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 09/594,882

(22) Filed: Jun. 15, 2000

(51) Int. Cl.[7] .......................... G06F 17/30; G06F 7/00; G06F 17/00; G09F 5/00
(52) U.S. Cl. ................ 707/1; 707/3; 707/102; 345/968
(58) Field of Search .................. 707/1, 3, 102; 709/213, 245, 229, 202; 713/201; 345/968, 821–823, 810, 835, 966, 845

(56) References Cited

U.S. PATENT DOCUMENTS 5,832,208 A * 11/1998 Chen et al. .................. 714/38
6,119,165 A * 9/2000 Li et al. ....................... 713/201
6,230,288 B1 * 5/2001 Kuo et al. .................... 714/38
6,347,375 B1 * 2/2002 Reinert et al. ............... 713/200
6,351,776 B1 * 2/2002 O'Brien et al. .............. 713/200
6,397,335 B1 * 5/2002 Franczek et al. ........... 709/229
6,611,925 B1 * 8/2003 Spear ........................... 714/38

* cited by examiner

*Primary Examiner*—Safet Metjahic
*Assistant Examiner*—Merilyn Nguyen
(74) *Attorney, Agent, or Firm*—Wood, Herron & Evans LLP; Scott A. Stinebruner (57) ABSTRACT

An apparatus, program product and method integrate virus checking functionality into a computer database search environment to assist in protecting a user computer from contracting a computer virus when accessing search results. The generation of a display representation of a result set generated in response to a search request may be based at least in part upon virus status information associated with at least a portion of a plurality of result records identified in the generated result set. Moreover, an apparatus, program product, and method configure a first computer to receive virus status information generated by a plurality of computers, with such received virus status information stored in a virus database that is accessible by the first computer.

54 Claims, 4 Drawing Sheets

VIRUS CHECKING AND REPORTING FOR COMPUTER DATABASE SEARCH RESULTS

FIELD OF THE INVENTION

The invention is generally related to computers and computer software. More specifically, the invention is related to virus checking and scanning, and to computer database searching.

BACKGROUND OF THE INVENTION

The amount and variety of information that can be accessed through a computer continues to increase at an astounding rate. The Internet, in particular, has enabled computer users to access a wide variety of information from other computers located all over the world.

As computers have become more and more connected to various information sources, however, computers have become increasingly at risk for contracting computer viruses. A computer virus can generally include any malicious or otherwise surreptitious computer program that "infects" a computer and performs undesirable activities in the computer. Some computer viruses are simply mischievous in nature; however, other viruses can cause a significant amount of harm to a computer and/or its user, up to and including stealing private data, deleting data and/or causing a complete computer failure. Some viruses even permit a third party to gain control of a user's computer outside of the knowledge of the user, while others may utilize a user's computer in performing other malicious activities such as launching denial-of-service (DOS) attacks against other computers.

Viruses can take many different forms, and can be spread in a wide variety of manners, e.g., as email attachments, macros or scripts, Trojan horses, worms, logic bombs, etc. (all of which, for the purposes herein, will be referred to hereinafter as "viruses"). Often, a virus will hide, or "infect", an otherwise healthy computer program so that the virus will be activated when the infected computer program is executed. Viruses typically also have the ability to replicate and spread to other computer programs, as well as other computers.

To address the risks associated with viruses, significant efforts have been directed toward the development of anti-virus computer programs that attempt to detect and/or remove viruses that attempt to infect a computer. Such efforts have resulted in a continuing competition where virus creators continually attempt to create increasingly sophisticated viruses and anti-virus developers continually attempt to protect computers from new viruses.

One capability of many conventional anti-virus programs is the ability to perform virus checking on virus-susceptible computer files after such files have been received and stored in a computer, e.g., after downloading emails or executable files from the Internet. Server-based anti-virus programs are also typically used to virus check the files accessible by a server. Such anti-virus programs, for example, are often used by web sites for internal purposes, particularly download sites that provide user access to a large number of downloadable executable files that are often relatively susceptible to viruses.

Virus checking is often both processor- and bandwidth-intensive, and as a result, conventional anti-virus programs are typically limited to performing virus checks for files that are stored generally in the same computers upon which such programs are executing. Thus, while specific entities, including end users and web sites, may be capable of performing virus checking on files stored locally on those entities' computers, oftentimes those entities are not capable of determining the viral risks associated with files under the control of other entities, at least not until such files can be retrieved and checked locally by an entity's anti-virus program.

The distributed and decentralized nature of the Internet and other shared computer networks, in particular, highlights the aforementioned limitations of conventional anti-virus technologies, since oftentimes a user will navigate to a wide variety of web sites and be able to download virus-susceptible files from a large number of entities outside of the control of the user.

A particular example of the risks is in performing Internet-based searches and accessing search results generated thereby. Sophisticated search engines and associated "portal" sites have been developed by search providers for the express purpose of facilitating the location of web sites, pages and other files of interest to users. Many conventional search engines, for example, maintain index- and/or directory-based computer databases that attempt to catalog content on the Internet such that relevant web pages or other files may be identified to users in response to search requests sent to the search engines by such users. Often, such databases include a large number of records associated with different files such that the records, rather than the files themselves, are searched.

Search results are typically returned to a search engine user in the form of a formatted list of entries or records that are associated with files such as web pages that match a search request. Often, hypertext links are provided so a user can access the associated files by selecting the links. Given, however, that the files are often hosted and controlled by entities other than a search provider, the search provider typically has no mechanism for determining the virus risks presented by the files identified in search results sent to users of the search engine. As a result, files accessed through search engine results often present a comparatively higher degree of risk of infection to users. Particularly if a user is not using local anti-virus software, such a user is significantly at risk of contracting a virus.

The competition between commercial search providers, whether such providers provide searching sites or search engines used by others, has become relatively tight, and as a result, search providers are continuously attempting to increase the number of users of such services, particularly those where revenue is derived principally from advertisements or subscriptions. For example, many search sites attempt to add additional functionality and features to induce additional users to use their services.

Given the stiff competition between search providers, it would be highly detrimental for a search provider to be identified even tangentially as the source of a virus that performs mischief in a user's computer. Nonetheless, given the lack of control that most search providers have over the files identified by the search results generated by such providers or their technology, often it is infeasible to create even a marginal level of trust that specific search results will not present a significant risk of infection to users.

The risks provided by Internet-based searching may also apply to other computer database searching environments, particularly where the possibility exists that files associated with certain search results will not be under the control of the entity that generates the search results. Therefore, a significant need exists in the art for a manner of decreasing the risks of viruses associated with accessing search results from computer database searches.

SUMMARY OF THE INVENTION

The invention addresses these and other problems associated with the prior art by providing in one aspect an apparatus, program product and method in which virus checking functionality is integrated into a computer database search environment to assist in protecting a user computer from contracting a computer virus when accessing search results. Specifically, consistent with the invention, the generation of a display representation of a result set generated in response to a search request is based at least in part upon virus status information associated with at least a portion of a plurality of result records identified in the generated result set.

Basing the generation of the display representation at least in part upon the virus status information permits the result set to be displayed in a manner that deters user selection of result records that may present a higher virus risk. For example (and it being understood that a wide variety of alternate operations may be performed), in some embodiments it may be desirable to simply omit displaying information related to result records found to present a virus risk, thereby effectively eliminating suspect search results from a result set. In the alternative, it may be desirable to highlight display information associated with suspect result records (e.g., with an icon or other distinct representation) to notify a user that such records present comparatively greater risks of viruses. Further, it may be desirable to highlight display information associated with trustworthy result records (e.g., with an icon or other distinct representation) to provide users with some assurance that particular records present comparatively lower risks of viruses. Other display options will be apparent to one of ordinary skill in the art having the benefit of the instant disclosure.

The invention also addresses additional problems associated with the prior art by providing an apparatus, program product, and method in which a first computer is configured to receive virus status information generated by a plurality of computers, with such received virus status information stored in a virus database that accessible by the first computer. As a consequence, multiple computers are capable of being relied upon to generate virus status information for use by a given computer, thereby permitting the responsibility for generating virus status information, as well as the processing horsepower required to generate the virus status information, to be allocated among the multiple computers. By distributing the virus checking responsibilities in this manner, a comparatively greater volume of virus status information may be generated and/or the timeliness of updates to existing virus status information may be improved.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
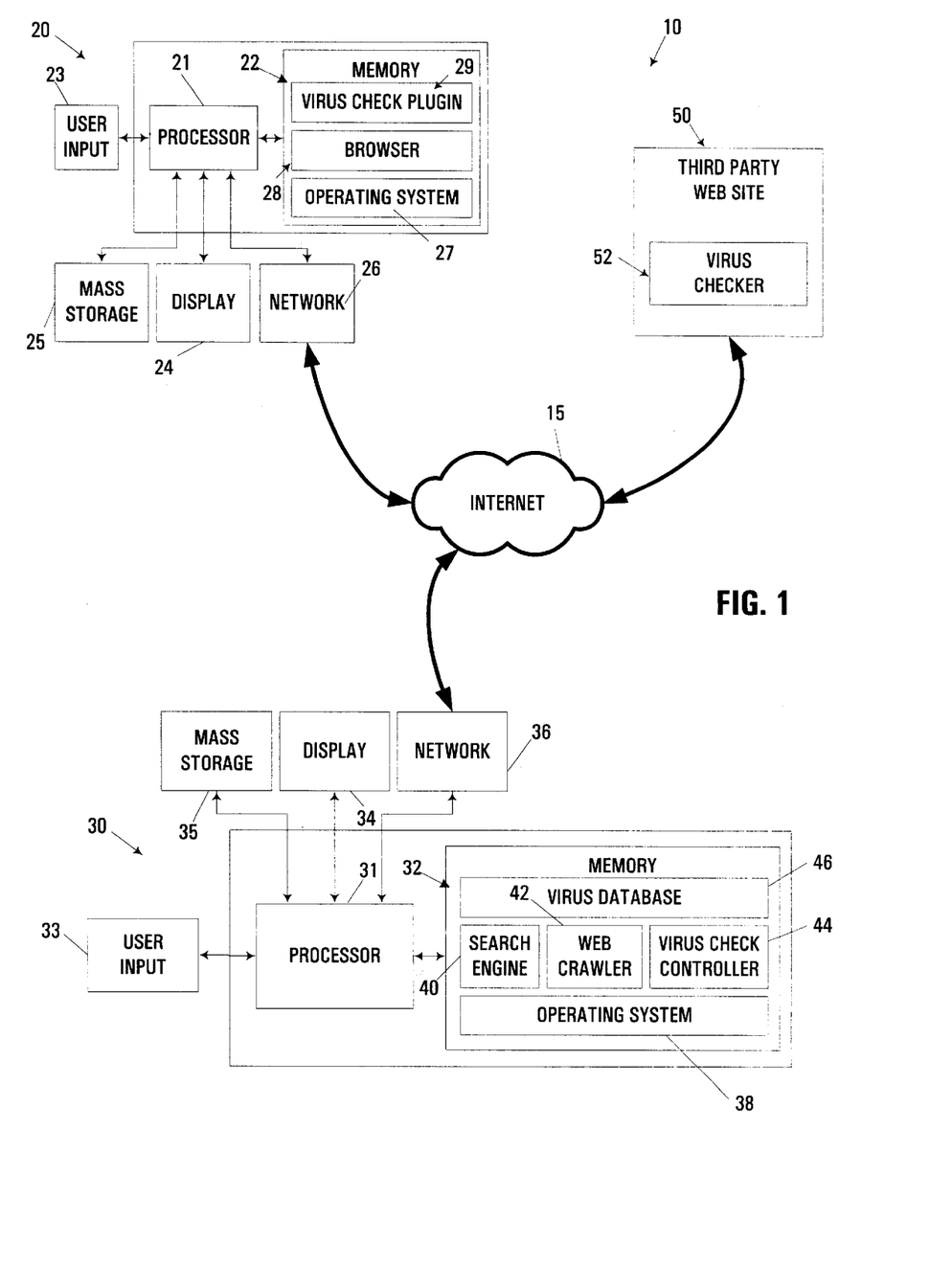
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is illustrated as a networked computer system including a plurality of computers or apparatuses 20, 30, 50 interfaced with one another over a network 15. Network 15 may represent practically any type of networked interconnection, including but not limited to local-area, wide-area, wireless, public networks (e.g., the Internet), and combinations thereof. Moreover, it will be appreciated that a wide variety of additional computers and other electronic devices may be networked through network 15.

In the illustrated implementation, computer system 10 is principally utilized in the generation and output of computer database search results to a user, in particular for locating and accessing web pages or web sites accessible via the Internet and/or one or more private networks using unique Uniform Resource Locators (URL's). To this extent, computer 20 is typically implemented as a client or user computer, as it is used by a user to generate a search request and receive search results responsive to such a request. Likewise, computer 30 is typically implemented as a server computer, as it is used to process incoming search requests from multiple users, access a computer database such as a web page index or directory in response to such search requests, and output search results to various user computers such as computer 20. Computer 50, which will be discussed in greater detail below, is also typically implemented as a server computer, as this computer is typically used to serve download files and other potentially virus-susceptible computer data to multiple users. In addition, and particularly if the entity owning either of computer 30, 50 is a large commercial entity (e.g., a large search site or download site on the Internet), either computer 30, 50 may also represent multiple computers networked together, e.g., operating as a farm or cluster used to host a web site and serve search results and/or downloadable files to hundreds or thousands of users.

For the purposes of the invention, each apparatus 20, 30 and 50 may represent practically any type of computer, computer system or other programmable electronic device, including a client computer, a server computer, a portable computer, a handheld computer, an embedded controller, etc. Each apparatus 20, 30 and 50 will hereinafter also be referred to as a "computer", although it should be appreciated the term "apparatus" may also include other suitable programmable electronic devices consistent with the invention.

As shown in FIG. 1, each computer 20, 30 typically includes at least one processor 21, 31 coupled to a memory 22, 32. A number of additional components 23–26 and 33–36, are also interfaced with each processor 21, 31, as will be discussed below. Like components to components 21–26 and 31–36 are also typically utilized in computer 50 (which, in many instances is similar in configuration to computer 30), although such components have been omitted from FIG. 1 to simplify the illustration.

Each processor 21, 31 may represent one or more processors (e.g., microprocessors), and each memory 22, 32 may represent the random access memory (RAM) devices comprising the main storage of the respective computer 20, 30, as well as any supplemental levels of memory, e.g., cache memories, non-volatile or backup memories (e.g., programmable or flash memories), read-only memories, etc. In addition, each memory 22, 32 may be considered to include memory storage physically located elsewhere in the respective computer 20, 30, e.g., any cache memory in a processor 21, 31, as well as any storage capacity used as a virtual memory, e.g., as stored on a mass storage device 25, 35 or on another computer coupled to either computer 20, 30 via a network.

Each computer 20, 30 also typically receives a number of inputs and outputs for communicating information externally. For interface with a user or operator, each computer 20, 30 typically includes one or more user input devices 23, 33 (e.g., a keyboard, a mouse, a trackball, a joystick, a touchpad, and/or a microphone, among others) and a display 24, 34 (e.g., a CRT monitor, an LCD display panel, and/or a speaker, among others).

For additional storage, each computer 20, 30 may also include one or more mass storage devices 25, 35, e.g., a floppy or other removable disk drive, a hard disk drive, a direct access storage device (DASD), an optical drive (e.g., a CD drive, a DVD drive, etc.), and/or a tape drive, among others. Furthermore, each computer 20, 30 may include an interface 26, 36 with one or more networks (e.g., a LAN, a WAN, a wireless network, and/or the Internet 15, among others) to permit the communication of information with other computers coupled to the network. It should be appreciated that each computer 20, 30 typically includes suitable analog and/or digital interfaces between processors 21, 31 and each of components 22–26 and 32–36 as is well known in the art.

Each computer 20, 30 operates under the control of an operating system 27, 38, and executes or otherwise relies upon various computer software applications, components, programs, objects, modules, data structures, etc. (e.g., components 28–29 in computer 20 and components 40–46 in computer 30, among others). Moreover, various applications, components, programs, objects, modules, etc. may also execute on one or more processors in another computer coupled to either computer 20, 30 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-Page ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention. For example, the invention may find applicability in assisting in providing virus protection for practically any form of computer-readable data accessed by a user via search results generated in response to a computer database search.

FIG. 1 also illustrates the principal software components utilized in implementing virus checking and reporting for computer database search results consistent with the invention. As discussed above, the illustrated implementation is specifically configured to provide virus protection in association with search results reflective of documents, files or other computer-readable data stored on the Internet or another form of public or private network. As such, computer 30 typically is implemented as a web server that implements search functionality for performing computer database searches suitable for accessing network-accessible data. Files, documents and other network-accessible data capable of being represented and accessed by a user via search results are commonly referred to hereinafter as "files", although it will be appreciated that this term may apply generally to practically any form of computer-readable data, so the term is likewise not restricted to any particular file, document, data structure or database format.

To support the search functionality described above, as well as to support additional virus checking and reporting functionality consistent with the invention, computer 30 utilizes a number of software components, including a search engine 40, a web crawler 42, a virus check controller 44 and a virus database 46.

Search engine 40 may be implemented using any number of known searching technologies, including index-based search engines and/or directory-based search engines, both of which are well known in the art. Search engine 40, however, is extended to support the generation of display information for a result set that is based at least in part on virus status information stored in virus database 46.

An index-based search engine typically accesses a computer database that has been constructed by a web crawler or other component, and that includes index records associated with particular files that include indexes of non-trivial terms and/or other data in the associated files. A search performed on an index-based search engine generally incorporates a search of the index records in a computer database to locate records having one or more indexed terms matching terms specified in a search request. Typically, each index record will include the index terms associated with that record, as well as the storage location (e.g., a URL) of the associated file. Additional information, e.g., a summary of the document, may also be implemented within an index record.

A directory-based search engine typically includes a computer database generated by a staff of researchers who categorize files according to content and create records associated with such files, each of which including a storage location and typically a title and summary of the contents of the associated file. The records are organized into different categories such that documents having a similar content are categorized in the same categories.

Various alternative searching technologies may be used in the alternative. For example, search engine 40 may utilize multiple search technologies, e.g., to access both an index-based database and a directory-based database. In addition, given that a wide variety of private computer networks utilize Internet-based technologies (e.g., when implemented as Intranets and/or Extranets), it will be appreciated that the files represented in a computer database consistent with the invention may be resident on a private network, or even on a single computer, and may be accessed via storage location identifiers other than URL's. Moreover, the invention may have applicability in the generation of search results from any other type of computer database wherein a risk exists of contracting a virus when accessing files associated with search results.

The discussion hereinafter will focus on two principle functionalities implemented to provide virus protection associated with computer database search results consistent with the invention. A first functionality is that of accessing virus status information associated with various result records in a search result set to assist in protecting a user from contracting a virus from any file represented in the search result set. A second functionality is that of building a database of virus status information to be utilized in checking search results for risk of virus infection.

The former functionality is principally implemented in the illustrated embodiment using search engine 40. The latter functionality, that of generating virus status information, is principally implemented in the illustrated embodiment using web crawler 42 and virus check controller 44 in computer 30, as well as virus check plugin 29 in computer 20 and virus checker component 52 in computer 50.

In particular, it will be appreciated that in many instances the potential number of files that may be accessed in response to a computer search request can be significantly large in number, particularly in the instance of Internet-based files. While it may be possible in some embodiments to perform virus checking of files represented by a result set in real-time after the result set is generated (either by the search engine or by a user computer), in many instances the amount of processing required to perform such virus scanning would be beyond the capabilities of many computers.

As such, it is often desirable to perform much of the generation of virus status information in the background, as well as to distribute at least a portion of the processing associated with generating such status information to other computers, such that existing virus status information, if available, can be accessed after a result set is generated to accelerate reporting or otherwise handling of potential sources of computer viruses in a result set.

One manner of off-loading virus status information generation to a background process is through the use of web crawler 42. In particular, web crawler 42 is typically implemented as an extension of conventional web-crawling functionalities that are commonly utilized to index files in the generation of index databases, in particular to add virus checking as another operation performed on a particular file while a web crawler is generating or updating an index record associated with that file. Virus checking performed by web crawler 42 is used to generate virus status information that is subsequently stored in virus database 46 and used by search engine 40 in the display of search results.

In other implementations, the volume of files capable of potentially being represented in a result set may even exceed the ability of a web crawler to provide virus status information for a large proportion of the files represented in any particular result set (it being understood that the primary goal of many web crawlers is to attempt to cover as much of the Internet as possible). Therefore, consistent with the invention, it is often desirable to further off-load some of the responsibility for performing virus checking to remote computers, and then rely on communications from those remote computers to generate virus status information stored in virus database 46. In the illustrated implementation, coordination of such activities is managed by virus check controller 44 in computer 30.

For example, responsibility for performing virus checking may be off-loaded to an extent to the actual users of the search engine. As illustrated in FIG. 1, for example, a user computer 20 may incorporate a virus check plugin 29 that operates in connection with a conventional browser 28 to perform virus checking of files accessed by a user, with the results of such operations returned to computer 30 and processed by virus check controller 44 for incorporation of associated virus status information in virus database 46.

Still another manner of off-loading responsibility for virus checking may be provided through other, third-party computers, including those of third-parties that are not actually users of the search engine. Such functionality is illustrated in FIG. 1 by virus checker 52, which performs virus checking of files accessible by computer 50, and reports virus status information back to virus check controller 44 for incorporation of such information into database 46.

Virus checker 52 is typically used to check files managed by computer 50 or otherwise under the responsibility of computer 50, either due to copies of the files being resident within the computer or due to the files being directly linked to and/or otherwise referenced by other files resident in the computer. For example, computer 50 may host a web site such as a download site that includes a number of downloadable files accessible to users over the Internet. Web sites, and in particular,. download sites and the like, often perform virus checking in the normal course of business using conventional virus scanning technology. In contrast with such internal virus protection measures, however, virus checker 52 supports the additional functionality of reporting the results of such virus checks to virus check controller 44 for the inclusion of the resulting status information in database 46.

While practically any type of web site or other source of files may be processed by virus checker 52, one particularly useful application is for use in connection with a download site, which routinely provides user access to a wide variety of downloadable software applications and other files that have a comparatively greater susceptibility to viral infection. Executable files, as well as files that access scripts and/or executable objects, as well as compressed files containing one or more of these types of files, are particularly susceptible to infection, and thus providing virus protection in association with a web site that provides user access to a large number of such files is often desirable.

As will become more apparent below, in addition to checking files managed by computer 50, virus checker 52 may also perform additional virus checking under the direct control of virus check controller 44, and report the results back to the virus check controller in due course. Similar functionality may also be implemented in plugin 29 if desired. Doing so permits controller 44 to off-load virus checking of specific files to other computers and thereby facilitate the generation of additional virus status information.

Assuming, for example, that a multiple of user computers and third-party computers are electronically coupled to computer 30 at different times, it will be appreciated that a significant amount of processing power may be allocated to generating virus status information in the manner described herein. As a result, the feasibility of generating virus status information for a large proportion of possible search results is dramatically increased. However, it will be appreciated by one of ordinary skill in the art having the benefit of the instant disclosure that virus status information may be generated in some embodiments solely by user computers, search engine computers or third-party computers, and thus, the invention is not limited to the use of all three methods discussed above.

Figures 2, 3:
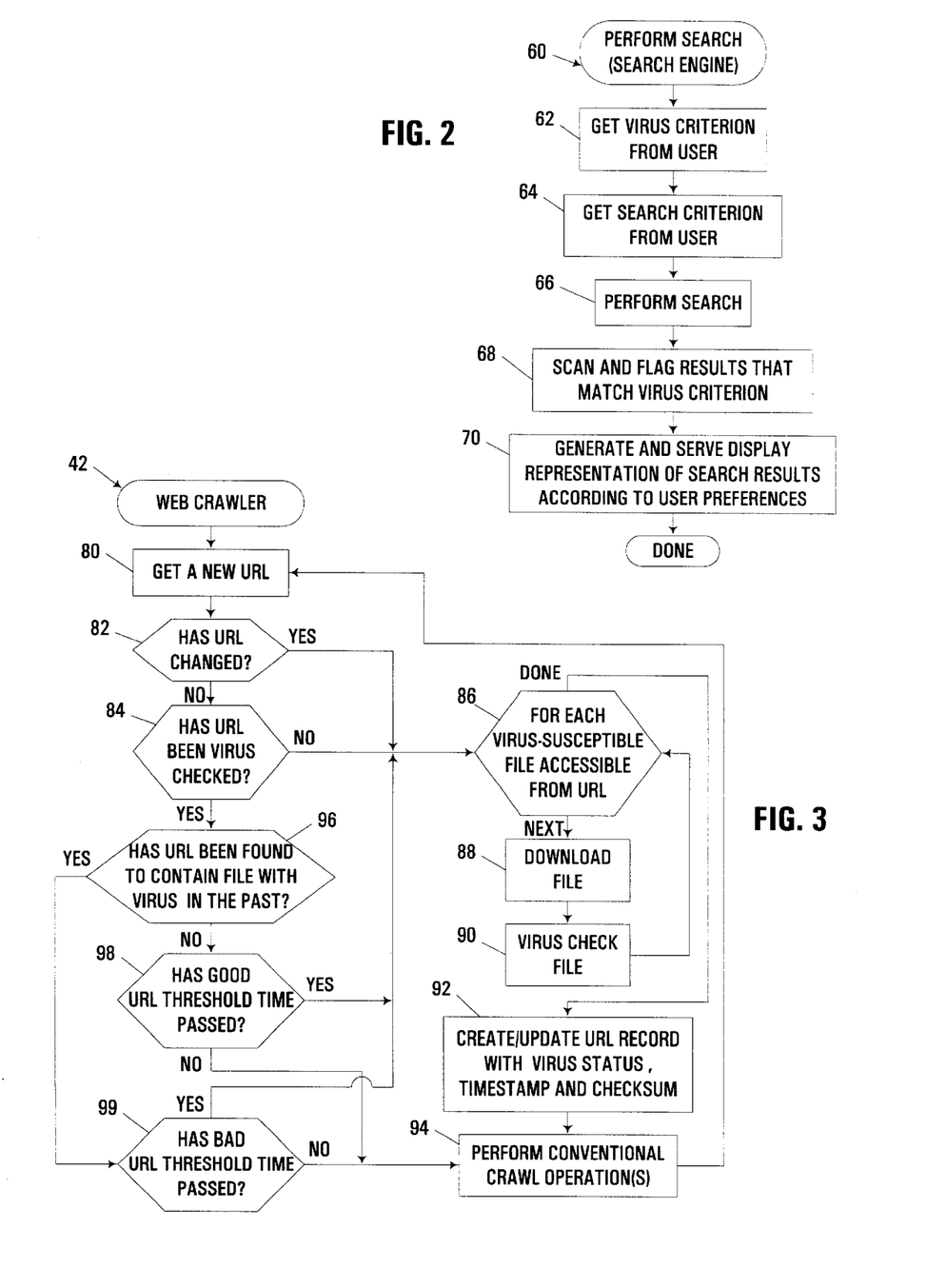
FIG. 2 is a flowchart illustrating a perform search routine executed by the search engine of FIG. 1.
FIG. 3 is a flowchart illustrating the program flow of the web crawler of FIG. 1.

FIG. 2 illustrates in greater detail an exemplary perform search routine 60 executed by search engine 40 of computer 30 to incorporate virus status information into the generation of search results consistent with the invention. In the illustrated embodiment, when performing a search, search engine 40 typically generates search results in response to a search request, with such search results represented by a result set that identifies a plurality of records in a database that match a search criterion specified by the search request. Further, in the illustrated embodiment, each record in the result set is associated with a particular file (e.g., by including a storage location for that file) that may be accessed by a user through the search results. For example, for an Internet-based search engine such as search engine 40, each record is associated with a particular Internet-accessible or otherwise network-accessible file, and each record typically includes a URL that provides the storage location of such associated file. Other manners of linking files with result records may be used in the alternative.

Routine 60 begins in blocks 62 and 64 by obtaining a virus criterion and a search criterion from a user.

The virus criterion obtained from the user typically specifies the rule by which files represented in a result set are to be indicated as being "untrustworthy", i.e., of presenting a comparatively higher risk of viral infection. The virus criterion, for example, may be based simply upon whether or not a file represented in a result set has been found to contain a virus. The virus criterion may also specify whether a file has been virus checked within a predetermined period of time, such that files that have not been found to be infected with a virus, yet have not been checked for a lengthy period of time, are still not considered trustworthy. The virus criterion may also specify whether a file has been changed since the last time a virus check was performed, such that modified files will not be considered to be trustworthy until they are re-checked. In addition, a period of time during which a file has been found to be free of viral infection may also be specified, such that files that were previously found to present a greater risk of a virus may still obtain trustworthy status after expiration of a sufficient period of time during which no viruses are found.

A virus criterion may also specify which, if any, additional files must be checked in order to certify a particular file as virus free. For example, a file may be defined as virus free if the actual contents of the file have been found to be free of any viruses. In the alternative, the status of a file may be dependent upon the status of additional files linked to that file, and as such, a file may be required to be linked only to files that are also virus free before that file may be determined to be trustworthy.

As an example, with many download sites, the bulk of the downloadable files available from such sites are executable files, and are not readily indexable or searchable due to their machine-readable content. On the other hand, such files are typically accessible via web pages or documents formatted in a text-based language such as Hypertext Markup Language (HTML), which itself is indexable and searchable, but which due to its nature usually provides a comparatively lower risk of viral infection. Nonetheless, it would generally be undesirable to indicate that an HTML document is trustworthy if it is linked to any infected executable file.

Therefore, to address the concerns associated with higher-risk files, it is desirable in many instances for a virus criterion to specify how additional files linked to a particular file are analyzed in determining the trustworthiness of that file. For example, a virus criterion may specify a link depth representing the number of sequential links that must be traversed from a particular file being analyzed. A virus criterion may also specify that the additional files be under the control of the same party as a file being analyzed, e.g., by limiting the linked-to files to be analyzed to those in the same domain.

Retrieval of a search criterion from a user, representing a search request made by that user, typically incorporates any number of known search technologies, including, for example, keyword-based searching, boolean-based searching, natural language searching, etc. In the illustrated implementation, for example, a search criterion may be obtained from a user via a search page (e.g., in HTML format) that is served to the user via the search engine, including appropriate input fields into which a user may input search terms. Submission of a search request is typically performed by selecting a submit button provided on the search page. However, other methods of inputting a search criterion may also be used in the alternative.

In the illustrated implementation, the virus criterion and search criterion may be input by a user through a common search page. In addition, it may be desirable to specify other user preferences, e.g., how to handle the display of search results determined to be untrustworthy. In the alternative, some or all of the virus and search criteria, as well as any additional user preferences, may be pre-stored for a user on the user's local computer, whereby at least a portion of either or both of blocks 62, 64 may incorporate retrieval of local user settings from the user's local computer. In addition, in some embodiments, certain aspects of the virus and search criterion, as well as any additional user preferences, may be modifiable by a user, or in the alternative, certain of such aspects may be fixed by a search engine and not capable of being set by a user.

Continuing with routine 60, once a virus criterion and search criterion have been obtained from a user, control passes to block 66 to perform the search, in a manner known in the art. As a result of performing the search, a result set is typically generated, identifying a plurality of result records that match the search criterion. In the case of an index-based or directory-based search engine, typically a result set includes identifiers of a plurality of index or directory records in the respective database, with each such record identifying one or more files, e.g., via URL's stored in such records.

Next, in block 68 the result set is scanned to obtain the URL associated with each result record, with each such URL used to access the virus database 46 to attempt to locate virus status information for each of the files represented by the result set. For each found record in the virus database, the virus status information therein is compared with the virus criterion to determine whether the associated file is or is not trusted to be uninfected (or free) of computer viruses. Each untrustworthy file represented by the result set is then flagged by the search engine to reflect its untrustworthy status. In addition, files not having any associated virus status information may be flagged as untrustworthy, or may be separately indicated in the result set.

Next, block 70 generates a display representation of at least a portion of the result set based upon both the virus status information for the result set and other additional user preferences discussed below. Block 70 also serves (i.e., transmits) the display representation to the user as the result of the search.

In the illustrated embodiment, for example, generating a display representation of the result set typically incorporates the generation of an HTML-compatible document such as a search result page listing display information associated with at least a subset of the result records in the result set. Typically the display information for a result record includes a title and URL for the associated file, and often a hypertext link to the URL so that a user may navigate directly to the associated file. The display information may additionally include other information such as a summary or excerpt of the file, a date for the file, and/or a relevancy score for the file.

Moreover, as discussed above, in many instances only a portion of the result records are represented in the HTML document, with additional hypertext links provided in the document to permit additional search results to be viewed. For example, a search result page may be generated to display the first fifty results, with links provided to select additional blocks of fifty results at a time. User preferences (e.g., as stored as local settings on the user's local computer, or as specified on a search page) may also be utilized in determining how to format the display representation of the search results.

Consistent with the invention, the generation of the display representation is based at least in part upon the virus status information retrieved for one or more result records in the result set. The display representation may be generated, for example, to omit any display information associated with result records found to present a risk of virus infection. In the alternative, the display information for result records determined to present a risk of virus infection may be highlighted in the display representation, e.g., by providing a unique icon in proximity with the display information, or through alternate highlighting operations such as the use of distinct display attributes (e.g., bold, italics, etc.), increased font size, distinct display color, animation, etc., or through the use of a dialog box or other pop-up display, a text notification elsewhere in the search results page, etc. Additionally, an audible signal such as a beep or other sound may be played back to a user to notify the user of a potential risk.

Furthermore, a user may be warned whenever the user interacts with the display information associated with a risky result record, e.g., when selecting, or even positioning a pointer proximate to, the display information or a hypertext link therein. Such warning may be provided, for example, through any of the highlighting techniques described above, as well a wide variety of other notification techniques.

Other forms of audio and/or visual techniques may also be incorporated into a display representation of a result set to indicate potential risks due to viruses, as will be appreciated by one of ordinary skill in the art having the benefit of the instant disclosure.

In addition to or in lieu of highlighting the display information for untrustworthy result records, it may also be desirable to highlight display information for result records associated with files trusted to be low risks for computer viruses, e.g., via icons or any other display mechanism described above. For example, it may be desirable to display a "certified" icon next to the display information associated with a particular result record found to be trustworthy.

It may also be desirable to define different degrees of trustworthiness, and separately identify result records matching such different degrees. For example, it may be desirable to separately identify files for which no virus status information is available. In the alternative, any such files may be considered to be untrustworthy along with those found to present a higher risk of viral infection. Also, files that have never had a virus may be distinguished from files that have been free of infection for a certain period of time.

It will be appreciated that a wide variety of alternate mechanisms for deterring a user from accessing a file associated with a result record having a comparatively higher risk of viral infection may be used in the alternative. Therefore, the invention is not limited to the particular mechanisms described herein.

Now turning to FIGS. 3–6, the various mechanisms capable of being used to generate virus status information in virus database 46 are described in greater detail below. As discussed above, one potential source of virus status information in virus database 46 is web crawler 42, the program flow of which is illustrated in greater detail in FIG. 3.

Web crawler 42 begins in block 80 by obtaining a new URL to be checked. Typically, selection of a new URL in block 80 is made via a web crawling protocol as is common with many web crawlers. For example, obtaining a new URL may be via the selection of a URL referenced in a hypertext link in a previously-processed file.

Once a new URL is obtained, control passes to block 82 to determine whether the URL has changed—that is, whether the file identified by the URL has been updated since the last time the file was virus checked. Typically, block 82 is implemented by retrieving a checksum such as a CRC from the file referenced at the URL and comparing the checksum with that stored in database 46 for the URL (if such a record exists). Alternate manners of determining whether a file has been updated from a prior point in time may also be used in the alternative, e.g., comparing a current timestamp with a revision date, scanning the contents of the file, and in other manners known in the art. In the alternative, the update status of a file may not be analyzed in other embodiments, whereby block 82 would be omitted.

If the URL has been determined to not have changed, control passes to block 84 to determine whether the URL has been virus checked. Typically, block 84 is implemented by accessing the record (if any) associated with the URL in the virus database 46 to determine whether virus status information is associated with the URL.

If either block 82 determines that the URL has changed, or block 84 determines that the URL has not previously been virus checked, control passes to block 86 to initiate a FOR loop to perform virus checking for the URL. Specifically, block 86 processes each virus-susceptible file that is accessible from the URL. Depending upon the particular virus scanning technology utilized, either only executable files may be analyzed, or in the alternative, all files, including compressed files, data files and/or the specific file stored at the URL, may be checked. Moreover, as discussed above, a link depth parameter may be utilized to determine how many links deep to traverse to determine the trustworthiness of the URL.

For each such virus-susceptible file, control passes to block 88 to download the file, and then to block 90 to perform virus checking on the file using any number of conventional virus scanning technologies known in the art. Control then returns to block 86 to process additional files accessible from the LFRL.

Once all such files have been checked for viruses, block 86 passes control to block 92 to create a new record or update an existing record for the URL in the virus database. Various types of virus status information may be stored in a URL record in the virus database, including, for example, the virus status (whether a virus was found in any accessible file), a timestamp (indicating when the URL was last checked for viruses), and a checksum (used to determine whether the URL has changed in a future access). Additional virus status information, e.g., the type of virus found, the names of any files found to contain viruses, etc. may also be stored in a URL record consistent with the invention.

Once the URL record has been created or updated, control passes to block 94 to perform conventional web crawling operations for the URL. In the alternative, web crawler 42 may not perform additional functions beyond virus checking, whereby block 94 may be omitted. Regardless, control next returns to block 80 to obtain a new URL for processing.

Returning to block 84, if a URL has been found to not have changed, and to have been virus checked in the past, control passes to block 96 to determine whether virus checking of the URL may be bypassed. In particular, block 96 determines whether the URL was last found to be untrustworthy, i.e., to reference a file with a virus or that is linked to another file with a virus, by accessing the URL record associated with the URL in the virus database to determine whether the virus status information indicates that a virus was found during the last virus check of the URL.

If the URL was not found to be untrustworthy, control passes to block 98 to determine whether a "good" URL threshold time has past—that is, whether an excessive period of time has elapsed since the URL was last virus checked. If not, control passes to block 94, whereby virus checking of the URL is bypassed. Otherwise, control passes to block 86 to perform virus checking for the file, in the manner discussed above.

Returning to block 96, if the URL was found to be untrustworthy, control passes to block 99 to determine whether a "bad" URL threshold time has past. If not, control passes to block 94 to bypass virus checking of the URL. Otherwise, control passes to block 86 to re-check the URL.

It will be appreciated that the "good" URL and "bad" URL threshold times may be determined empirically or otherwise set to ensure that virus status information for URL's in the virus database is kept relatively current. Moreover, different threshold times may be associated with "good" and "bad" URL's, or the same threshold time may be used in both instances.

As discussed above, another source of virus status information is via a user computer such as user computer 20 of FIG. 1. In the illustrated implementation, the virus check performed in the user computer is performed via a plugin 29 to a browser 28, e.g., a conventional browser such as the Internet Explorer browser from Microsoft Corporation or the Navigator browser from Netscape Communications. In the alternative, the virus checking functionality described herein may be implemented directly within a browser, or within a completely separate application therefrom. Such functionality may also be sent in real-time to a user in connection with search results, e.g., via a script-based or executable object implementation. The invention is therefore not limited to the particular plugin-based virus checking implementation discussed herein.

Figure 4:
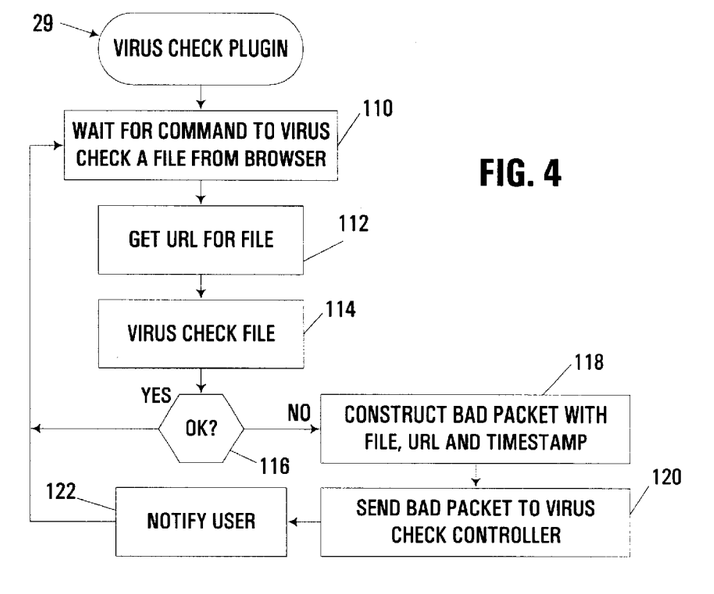
FIG. 4 is a flowchart illustrating the program flow of the virus check plugin of FIG. 1.

Virus check plugin 29 is illustrated in greater detail in FIG. 4, the program flow of which begins in block 110 by waiting for a command from the browser to virus check a particular file. In particular, plugin 29 is configured to wait until a user attempts to download a virus-susceptible file such as an executable file or a file containing a script or link to an executable object. In addition, in some implementations it may be desirable to notify the plugin to virus check a particular file whenever a file is found to reference other files that may be susceptible to viral infection. Implementation of such functionality within browser 28 and plugin 29 would be within the abilities of one of ordinary skill in the art having the benefit of the instant disclosure, typically with the browser configured to monitor which files the user attempts to download and notify the plugin when any virus-susceptible files (e.g., executable files) are being requested by a user.

Whenever a command is received from the browser, control passes to block 112 to obtain the URL for the file (or alternatively, the URL for the file referencing that file). Next, block 114 virus checks the file using conventional virus scanning technology.

Next, block 116 determines whether a virus was found. If a virus was found, control passes to block 118 to construct a "bad" packet, typically including the name of the file, the URL associated therewith, and a timestamp indicating when the virus scan was performed for the file. In addition, other information, e.g., the type of virus, may also be provided in the "bad" packet. Next, block 120 sends the "bad" packet to the virus check controller, and block 122 optionally notifies the user that a virus was found. In addition, it may be desirable to permit the user to perform inoculation of the file, or to perform other reporting functionalities as are well known in the virus scanning art. Upon completion of block 122 control returns to block 110 to process additional files (if any).

Returning to block 116, if no virus is found, control passes directly to block 110. In the alternative, in some implementations it may be desirable to send a "good" packet to the virus check controller if no virus is found.

In the illustrated implementation, any packets sent by plugin 29 to virus check controller 44 are encrypted and provided with authentication information so that the virus check controller is able to authenticate the contents of the packet, as well as the sender thereof, so that only trustworthy packets will be utilized to update the virus status information in the virus database. Additional functionality may be incorporated into plugin 29 to ensure that the plugin was not modified, and thereby prevent a malicious party from attempting to corrupt the virus status information in the database with invalid data. Typically, therefore, whenever plugin 29 is distributed to a user, additional authorization mechanisms may need to be performed, e.g., to initially register the plugin with the virus check controller.

Figure 5:
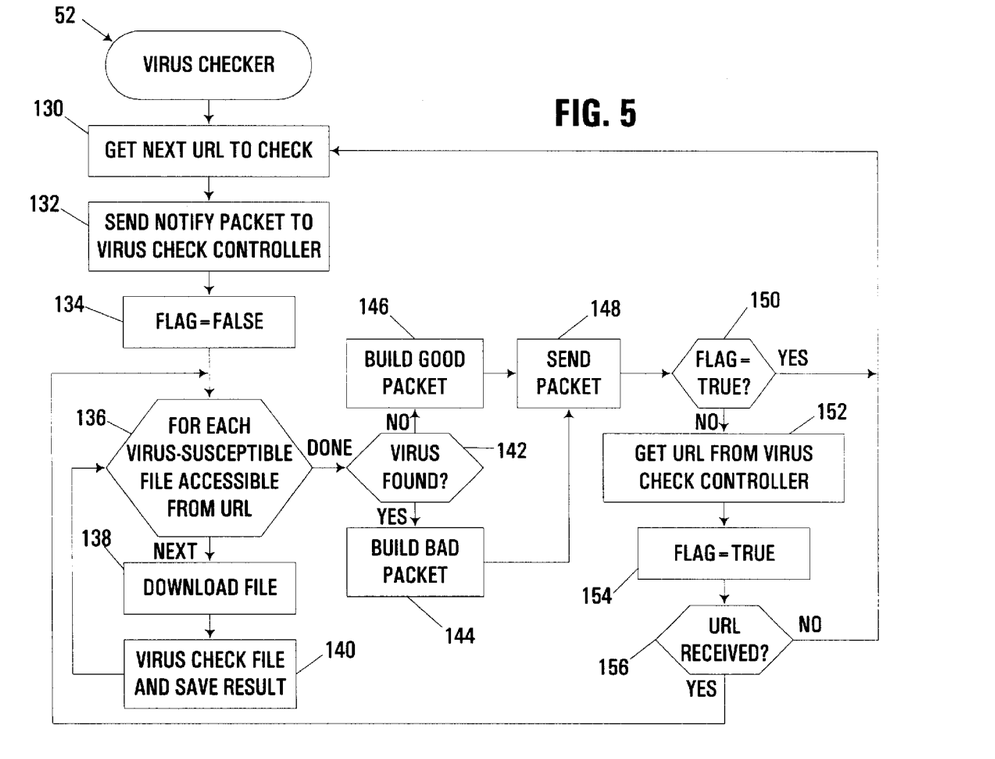
FIG. 5 is a flowchart illustrating the program flow of the virus checker of FIG. 1.

FIG. 5 illustrates the program flow of yet another optional source of virus status information, that of virus checker 52 provided on a third-party computer such as a web server or server complex. Virus checker 52 operates in a continuous loop, obtaining in block 130 a next URL to check. The determination of which URL to check next may be performed using any number of algorithms, e.g., by selecting URL's from each file accessible from the web site. In some implementations, a list of URL's may also be provided by a search provider for processing as a form of server-based "tax" or fee for permitting users of a search engine to search for and access files on the third party computer.

Next, for each such URL, block 132 sends a "notify" packet to the virus check controller to indicate that the virus checker is initiating a virus check of a new WRL. The URL being checked is optionally provided in the "notify" packet, although in many instances, no URL need be provided, since the purpose of the "notify" packet is to request that the virus check controller send a supplemental UPL to be virus checked by the virus checker.

Next, a flag is set to "false" in block 134. The flag operates as a mode selector that is used to permit the virus checker to alternately check URL's selected in block 130 (herein referred to as internally-provided URL's) with additional URL's provided to the virus checker by the virus check controller of computer 30 (herein referred to as externally-provided URL's). Other mechanisms for scheduling the checking of URL's generated internally by the virus checker and externally by the virus check controller may also be used in the alternative, e.g., to vary the load of URL's supplied by the respective sources.

Block 136 next virus checks the URL by initiating a FOR loop to process each virus-susceptible file accessible from the URL. For each such file, block 138 downloads the file, and block 140 performs a virus check on the file and temporarily saves the result of the virus check. It will be appreciated that downloading of the file in block 138 may require retrieval from an external source, or in the alternative, a copy of the file may be maintained on computer 50, whereby downloading the file involves retrieval of the file from local storage.

Once each virus-susceptible file has been processed, block 136 passes control to block 142 to determine whether any virus was found in any file accessible from the URL. If so, a "bad" packet, similar to that constructed by plugin 29, is constructed in block 144. If no virus is found, block 142 instead passes control to block 146 to construct a "good" packet similar to that described above in connection with plugin 29. Once either type of packet is constructed, the packet is sent to the virus check controller in block 148. Additionally, the packet may be encrypted and supplied with a digital signature as required to be authenticated by the virus check controller.

Once the packet is sent, control passes to block 150 to determine whether the flag is set to "true" (indicating that an externally-supplied URL is being processed). If not (as with the first pass through the routine), control passes to block 152 to retrieve an externally-supplied URL from the virus check controller. Block 154 then sets the flag to "true" and block 156 determines whether a new URL was received from the virus check controller. If so, control returns to block 136 to virus check each virus-susceptible file accessible from that URL. If no URL is received in block 156, or if the flag is already set to "true" in block 150, control returns to block 130 to retrieve another internally-provided URL to be checked. Therefore, it may be seen that the illustrated implementation of virus checker 52 alternates between internally-supplied and externally-supplied URL's. In the alternative, no externally-supplied URL's may be provided to virus checker 52, whereby such functionality in FIG. 5 related thereto may be omitted.

Figure 6:
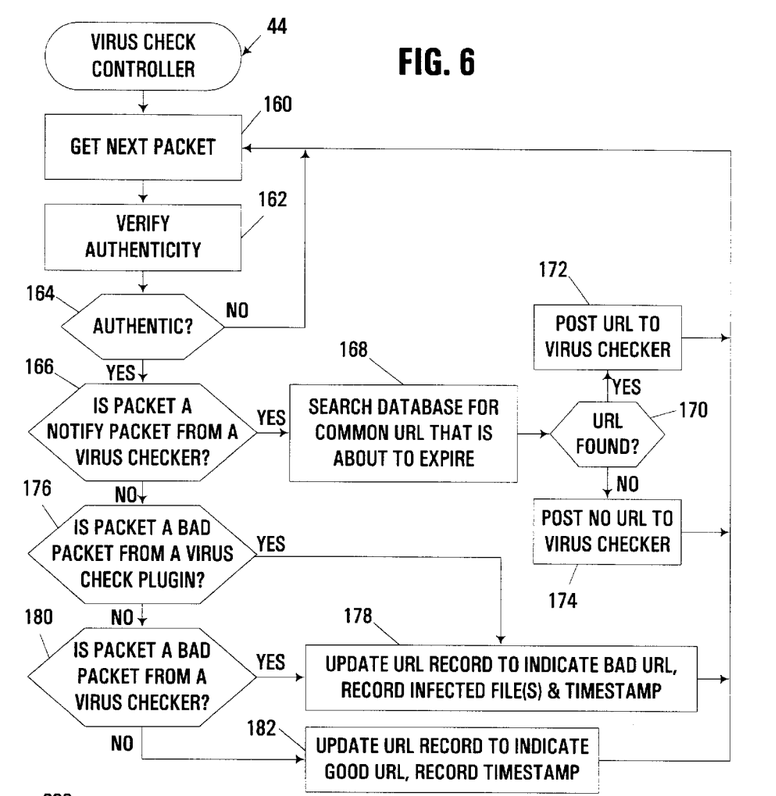
FIG. 6 is a flowchart illustrating the program flow of the virus check controller of FIG. 1.

FIG. 6 illustrates the program flow of virus check controller 44 in greater detail. In general, virus check controller 44 is configured to operate in a continuous loop to process incoming packets from each authorized virus check plugin and virus checker accessible to the virus check controller. Virus check controller 44 begins by waiting in block 160 for a next packet to be received from an external source. In response to receipt of such a packet, control passes to block 162 to verify the authenticity of the packet. As an example, it may be desirable to maintain a database of authorized virus check plugins and/or virus checkers, and access the database to determine whether an incoming packet is an authentic packet received from an authorized user. Any number of conventional security technologies, e.g., public key encryption, and/or digital signatures may be used. Moreover, it may be desirable in block 162 to decrypt the packet if encryption has been used on the packet.

If the packet is not determined to be authentic, control passes from block 164 to block 160 to wait for a next packet, thereby effectively discarding the current packet. If, however, the packet is determined to be authentic, block 164 passes control to block 166 to determine whether the packet is a "notify" packet from a virus checker. As discussed above in connection with FIG. 5, a "notify" packet is used to alert the virus check controller that a particular virus checker is ready to receive an externally-supplied URL for performing additional virus checking once virus checking of a current internally-provided URL is complete. Therefore, in response to such a packet, block 166 passes control to block 168 to search the virus database for a URL that is about to expire—that is, a URL having a timestamp that exceeds a predetermined threshold, indicating that the URL needs to be re-checked. In addition, it may be desirable to prioritize URL's that are more commonly accessed than other URL's, thereby maximizing the likelihood that a particular URL retrieved in response to a search request will have been virus checked. Any number of conventional technologies for maintaining a record of the relative frequency in which particular URL's are accessed may be used in connection with block 168.

Next, block 170 determines whether a suitable URL was found. If so, control passes to block 172 to post the URL to the virus checker, typically by sending an encrypted packet containing the URL to the virus checker. Control then returns to block 160 to wait for additional packets.

Returning to block 170, if no suitable URL was found, control passes to block 174 to post "no URL" to the requesting virus checker, e.g., by sending a packet to the virus checker indicating that no URL is available. Control then returns to block 160.

Returning to block 166, if the received packet is not a "notify" packet, control passes to block 176 to determine whether the packet is a "bad" packet received from a virus check plugin. If so, control passes to block 178 to update the URL record associated with the URL specified in the packet to indicate that the URL is not trustworthy. In addition, if additional information such as a timestamp and/or the identity of any infected files is provided in the packet, such information is also stored in the virus status information for the URL. Moreover, if no URL record exists, a new record may be created in the virus database therefor. Control then returns to block 160 to process additional packets.

Returning to block 176, if the packet is not a "bad" packet from a virus check plugin, control passes to block 180 to determine whether the packet is a "bad" packet from a virus checker. If so, control passes to block 178 to update or create a record in the virus database associated with the URL specified in the packet. And returning to block 180, if the packet is not a "bad" packet from a virus checker, it is assumed that the packet is a "good" packet from a virus checker, and control therefore passes to block 182 to update or create a URL record in the virus database for the URL associated with the packet, indicating that the URL has been found to be trustworthy, and typically incorporating a timestamp indicating when the trustworthiness of the URL was determined via virus checking. Control then returns to block 160.

Figure 7:
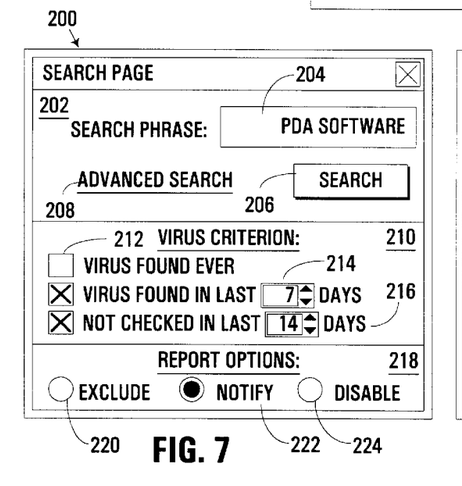
FIG. 7 is a diagram of an exemplary search page generated by the search engine of FIG. 1.

As an example of a search operation performed with the computer system 10 of FIG. 1, FIG. 7 illustrates a browser window 200 associated with browser 28 of computer 20, and shown displaying a search page 202 generated by search engine 40 of computer 30. In the search page, a user is permitted to input a search criterion into an input field 204, with a search request being generated in response to selection of a search button 206 when selected by the user. In addition, it will be appreciated that it may be desirable to provide additional advanced search capabilities, e.g., via an advanced search page accessible via a hypertext link 208.

Search page 202 also permits a user to input a virus criterion, e.g., as shown in region 210, to permit a user to specify the rule utilized to determine whether a file is determined to be trusted to be a low risk for a computer virus. For example, checkbox 212 permits a user to specify that a file will be determined to be untrustworthy if a virus has ever been associated with the file. Checkbox 214 permits a user to request that a file will be determined to be untrustworthy if a virus was found within a predetermined time period, e.g., within a user-selectable number of days. Checkbox 216 permits a user to request that a file will be found to be untrustworthy if the file has not been checked in a predetermined time period, e.g., within a user-selectable number of days. Additional virus criteria, e.g., a link depth or any other alternatives discussed above, may also be presented in region 210.

It may also be desirable in search page 202 to provide inputs for user preferences such as report options as illustrated in region 218. The report options specify how the display representation of the search results will be generated based on the trustworthiness determination made using the specified virus criterion. For example, selection of radio button 220 indicates that a user wishes to exclude any result record matching the virus criterion, such that no display information for the result record will be displayed in the search results. Radio button 222 alternately permits a user to be notified of any result records matching the virus criterion. Radio button 224 permits a user to disable any reporting of virus status information in the returned search results. Other report options, e.g., type of highlighting, whether to highlight untrustworthy and/or trustworthy results, etc., may also be submitted by a user in search page 202 consistent with the invention.

Figure 8:
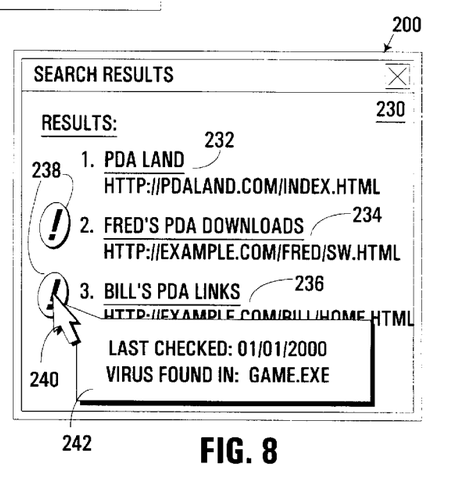
FIG. 8 is a diagram of an exemplary search results page generated by the search engine of FIG. 1.

FIG. 8 next illustrates an exemplary search results page 230 generated by the search engine in response to a search request forwarded to the search engine by the user computer. In the exemplary search results, display information associated with three result records is illustrated at 232, 234 and 236. Assume, for the purposes of the example, that the result records entitled "Fred's PDA Download" and "Bill's PDA Links" were found to be untrustworthy according to the user-selected virus criterion, and that the user has specified that he or she should be notified of untrustworthy results. One implementation of a search results page therefore may result in the display of icons 238 adjacent or proximate to the display information 234, 236 therefor to notify a user that the documents are untrustworthy. In the alternative, and as discussed above, other mechanisms for highlighting the display information 234, 236 may be used, and in addition or in lieu of highlighting the display information for untrustworthy results, highlighting of display information for trustworthy results such as that associated with display information 232 may be performed (e.g., using a certified icon or like representation).

An additional function that may be supported is the ability to display virus status information responsive to user input. For example, FIG. 8 illustrates user selection of an icon 238 associated with display information 236 by a user-manipulated pointer 240. In response to user input directed to icon 238, a pop-up window 242 is displayed, including display information regarding additional virus status information associated with the URL, e.g., a timestamp and name of an infected file. The user input that invokes the display of window 242 may be depression of a mouse button, or in the alternative, may simply be the positioning of pointer 242 over icon 238, among other input. Given the wide variety of alternate graphical user interface components available in a web browsing platform, it will be appreciated that an innumerable number of alternate mechanisms may be utilized to both invoke the display of virus status information, as well as present such information to a user consistent with the invention.

Various modifications may be made to the illustrated embodiments without departing from the spirit and scope of the invention. For example, real-time virus checking may also be performed for search results in lieu of or in addition to utilizing pre-stored virus status information. Such real-time checking functionality may be implemented, for example, in a separate thread in the search engine, or may be performed locally by a user computer in some implementations. Moreover, real-time virus checking may be performed on all search results, or in the alternative, real-time virus checking may be performed only for search results lacking associated virus status information. Furthermore, virus inoculation may also be supported in some embodiments to repair infected files or computers.

The illustrated embodiments have a number of unique advantages over conventional virus checking technologies. For example, by modifying the display of search results based upon the trustworthiness of those results, users may be deterred from potentially navigating to risky files and contracting computer viruses. In addition, the virus status information used in making such determinations often may be generated prior to the generation of search results, such that real-time virus checking can be reduced or avoided altogether. Moreover, the overhead associated with generating virus status information may be distributed to multiple computers, including those of users that utilize a search engine, as well as other third-party computers such as those associated with download and other web sites.

Particularly when used in connection with a large commercial Internet-searching enterprise, the implementation of virus checking and reporting as discussed herein may provide significant benefits. Providing such functionality, for example, provides a value-added feature that encourages greater hits from users, and thus greater advertising revenue and/or subscription revenue for subscription-based services.

In addition, for large commercial enterprises, the ability to distribute virus checking responsibility to a large user base significantly increases the amount of virus status information that can be generated and compiled in a virus database. Further, the use of a virus checker on a third-party computer to essentially perform "self-checking" and "self-certification" of the files managed by the third party. Moreover, providing the ability to send additional URL's to the third-party computer to perform additional virus checking further expands the processing base from which virus status information may be generated.

Other modifications will be apparent to one of ordinary skill in the art. Therefore, the invention lies in the claims hereinafter appended.

What is claimed is:

1. A computer-implemented method of processing a search request, the method comprising:
   (a) accessing a computer database in response to a search request to generate a result set, the result set identifying a plurality of result records;
   (b) accessing virus status information associated with at least a portion of the plurality of result records; and
   (c) generating a display representation of at least a portion of the result set based upon the virus status information, wherein generating the display representation includes highlighting display information associated with a selected result record from the result set in the display representation if virus status information associated with the selected result record indicates one of (1) that the selected result record is trusted to be a low risk for infection by a computer virus, and (2) that the selected result record is not trusted to be a low risk for infection by a computer virus.

2. The method of claim 1, wherein the computer database includes at least one of a web page index and a web page directory that includes a plurality of database records, each of which identifying a Uniform Resource Locator (URL) of an associated computer file.

3. The method of claim 1, wherein generating the display representation includes generating display information associated with a selected result record from the result set in the display representation only if virus status information associated with the selected result record indicates that the selected result record is trusted to be a low risk for infection by a computer virus.

4. The method of claim 1, further comprising determining whether a selected result record from the result set is trusted to be a low risk for infection by a computer virus by comparing virus status information associated with the selected result record with a virus criterion.

5. The method of claim 4, wherein the virus criterion specifies at least one of whether a result record has ever been found to be infected by a computer virus, whether a result record has been found to be infected by a computer virus within a first predetermined time period, and whether a result record has been virus checked within a second predetermined time period.

6. The method of claim 1, further comprising:
   (a) performing virus checking for at least a portion of the records in the computer database to generate virus status information associated therewith; and
   (b) storing the virus status information generated during virus checking within a virus database;
      wherein accessing virus status information associated with the portion of the plurality of result records includes accessing the virus database.

7. The method of claim 6, wherein performing virus checking is performed during a crawling operation, the method further comprising performing virus checking for a selected record in the database in response to at least one of a modification to a file associated with the selected record and an expiration of a time period since the selected record was last virus checked.

8. The method of claim 6, wherein performing virus checking includes performing virus checking for a selected record from the computer database by virus checking at least one of a file associated with the selected record and each virus-susceptible file linked to the associated file.

9. The method of claim 6, wherein performing virus checking includes performing virus checking for at least a portion of the plurality of result records prior to generation of the result set.

10. The method of claim 6, wherein performing virus checking further includes performing virus checking in a plurality of computers, the method further comprising receiving virus status information from at least a portion of the plurality of computers.

11. The method of claim 10, wherein receiving virus status information further comprises authenticating the received virus status information prior to storing the received virus status information in the virus database.

12. The method of claim 10, wherein performing virus checking in the plurality of computers includes performing virus checking in a client computer, the method further comprising:
   (a) issuing the search request from the client computer; and
   (b) receiving and displaying the display representation of the portion of the result set using the client computer.

13. The method of claim 12, wherein performing virus checking includes performing virus checking on a selected file in the client computer responsive to a user request to retrieve the selected file.

14. The method of claim 10, further comprising:
   (a) sending a storage location identifier to a selected computer from the plurality of computers;
   (b) performing virus checking on a selected file identified by the storage location identifier to generate virus status information for the selected file; and
   (c) sending the virus status information associated for the selected file from the selected computer for inclusion in the virus database.

15. The method of claim 10, wherein performing virus checking in the plurality of computers includes performing virus checking in a selected computer by virus checking a plurality of files accessible by the selected computer.

16. A computer-implemented method of processing a search request, the method comprising:
   (a) accessing a computer database in response to a search request to generate a result set, the result set identifying a plurality of result records;
   (b) accessing virus status information associated with at least a portion of the plurality of result records; and
   (c) generating a display representation of at least a portion of the result set based upon the virus status information, wherein generating the display representation includes highlighting display information associated with a selected result record from the result set in the display representation if virus status information associated with the selected result record indicates that the selected result record is trusted to be a low risk for infection by a computer virus.

17. The method of claim 16, wherein highlighting the display information associated with the selected result record includes displaying an icon proximate the display information to indicate that the selected result record is trusted to be a low risk for infection by a computer virus.

18. A computer-implemented method of processing a search request, the method comprising:

(a) accessing a computer database in response to a search request to generate a result set, the result set identifying a plurality of result records;

(b) accessing virus status information associated with at least a portion of the plurality of result records; and (c) generating a display representation of at least a portion of the result set based upon the virus status information, wherein generating the display representation includes highlighting display information associated with a selected result record from the result set in the display representation if virus status information associated with the selected result record indicates that the selected result record is not trusted to be a low risk for infection by a computer virus.

19. The method of claim 18, wherein highlighting the display information associated with the selected result record includes displaying an icon proximate the display information to indicate that the selected result record is not trusted to be a low risk for infection by a computer virus.

20. The method of claim 18, further comprising displaying at least a portion of the virus status information associated with the selected result record in response to user input.

21. The method of claim 20, wherein displaying the virus status information includes displaying the virus status information in a pop-up window in response to user input directed to an icon displayed proximate the display information.

22. The method of claim 20, wherein displaying the virus status information includes displaying at least one of an infected file name and a timestamp that indicates when the selected result record was last checked for viruses.

23. An apparatus, comprising:

(a) a computer database including a plurality of records; and (b) a program configured to access the computer database in response to a search request to generate a result set, the result set identifying a plurality of result records from the plurality of records, and the program further configured to access virus status information associated with at least a portion of the plurality of result records, and generate a display representation of at least a portion of the result set based upon the virus status information, wherein the program is configured to generate the display representation by highlighting display information associated with a selected result record from the result set in the display representation if virus status information associated with the selected result record indicates one of (1) that the selected result record is trusted to be a low risk for infection by a computer virus, and (2) that the selected result record is not trusted to be a low risk for infection by a computer virus.

24. The apparatus of claim 23, wherein the computer database includes at least one of a web page index and a web page directory, and wherein each record identifies a Uniform Resource Locator (URL) of an associated computer file.

25. The apparatus of claim 23, wherein the program is configured to generate the display representation by generating display information associated with a selected result record from the result set in the display representation only if virus status information associated with the selected result record indicates that the selected result record is trusted to he a low risk for infection by a computer virus.

26. The apparatus of claim 23, wherein the program is further configured to determine whether a selected result record from the result set is trusted to be a low risk for infection by a computer virus by comparing virus status information associated with the selected result record with a virus criterion.

27. The apparatus of claim 26, wherein the virus criterion specifies at least one of whether a result record has ever been found to be infected by a computer virus, whether a result record has been found to be infected by a computer virus within a first predetermined time period, and whether a result record has been virus checked within a second predetermined time period.

28. The apparatus of claim 23, further comprising a crawler computer program configured to perform virus checking for a plurality of records from the computer database during a crawling operation, and wherein the crawler computer program is configured to performing virus checking for a selected record in the computer database in response to at least one of a modification to a file associated with the selected record and an expiration of a time period since the selected record was last virus checked.

29. The apparatus of claim 23, further comprising a virus database configured to store the virus status information, wherein the program is configured to access the virus status information by accessing the virus database, and wherein at least a portion of the virus status information is resident in the virus database prior to generation of the result set.

30. The apparatus of claim 29, wherein the program is resident in a first computer, the first computer further configured to receive virus status information from a second computer.

31. The apparatus of claim 30, wherein the second computer is among a plurality of computers in communication with the first computer, wherein at least a portion of the plurality of computers are configured to perform virus checking and send virus status information generated in response to virus checking.

32. The apparatus of claim 31, wherein the program is further configured to authenticate received virus status information prior to storing the received virus status information in the virus database.

33. The apparatus of claim 23, wherein the second computer is further configured to issue the search request, and to receive and display the display representation of a portion of the result set.

34. The apparatus of claim 33, wherein at least one of the plurality of computers is configured to perform virus checking on a selected file responsive to a user request to retrieve the selected file.

35. The apparatus of claim 23, wherein the program is further configured to send a storage location identifier to a selected computer from the plurality of computers, and wherein the selected computer is configured to perform virus checking on a selected file identified by the storage location identifier to generate virus status information for the selected file, and to send the virus status information associated with the selected file from the selected computer for inclusion in the virus database.

36. The apparatus of claim 23, wherein performing virus checking in the plurality of computers includes performing virus checking in a selected computer by virus checking a plurality of files accessible by the selected computer.

37. An apparatus, comprising:
(a) a computer database including a plurality of records, and
(b) a program configured to access the computer database in response to a search request to generate a result set, the result set identifying a plurality of result records from the plurality of records, and the program further configured to access virus status information associated with at least a portion of the plurality of result records, and generate a display representation of at least a portion of the result set based upon the virus status information, wherein the program is configured to generate the display representation by highlighting display information associated with a selected result record from the result set in the display representation if virus status information associated with the selected result record indicates that the selected result record is trusted to be a low risk for infection by a computer virus.

38. An apparatus, comprising:
(a) a computer database including a plurality of records; and
(b) a program configured to access the computer database in response to a search request to generate a result set, the result set identifying a plurality of result records from the plurality of records, and the program further configured to access virus status information associated with at least a portion of the plurality of result records, and generate a display representation of at least a portion of the result set based upon the virus status information, wherein the program is configured to generate the display representation by highlighting display information associated with a selected result record from the result set in the display representation if virus status information associated with the selected result record indicates that the selected result record is not trusted to be a low risk for infection by a computer virus.

39. A program product, comprising:
(a) a program configured to access a computer database in response to a search request to generate a result set, the result set identifying a plurality of result records from the computer database, and the program further configured to access virus status information associated with at least a portion of the plurality of result records, and to generate a display representation of at least a portion of the result set based upon the virus status information, wherein the program is configured to generate the display representation by highlighting display information associated with a selected result record from the result set in the display representation if virus status information associated with the selected result record indicates one of (1) that the selected result record is trusted to be a low risk for infection by a computer virus, and (2) that the selected result record is not trusted to be a low risk for infection by a computer virus; and
(b) a signal bearing medium bearing the program.

40. The program product of claim 39, wherein the signal bearing medium includes at least one of a recordable medium and a transmission medium.

41. A computer-implemented method of building a virus database, the method comprising:

(a) receiving with a first computer virus status information generated by a plurality of computers, the virus status information generated by each of the plurality of computers associated with at least one file accessible by the respective computer from the plurality of computers;
(b) storing the virus status information for each file in a virus database accessible by the first computer; and
(c) authenticating received virus status information prior to storing the received virus status information in the virus database.

42. The method of claim 41, further comprising:
(a) accessing a second computer database in response to a search request to generate a result set, the result set identifying a plurality of result records;
(b) accessing the virus database to retrieve virus status information associated with at least a portion of the plurality of result records; and
(c) generating a display representation of at least a portion of the result set based upon the virus status information.

43. The method of claim 41, further comprising, during a crawling operation performed by the first computer, performing virus checking of a plurality of files with the first computer.

44. The method of claim 41, further comprising performing virus checking in a client computer from the plurality of computers that is configured to issue a search request, and to receive and display a display representation of a result set generated in response to the search request.

45. The method of claim 44, wherein performing virus checking includes performing virus checking on a selected file in the client computer responsive to a user request to retrieve the selected file.

46. The method of claim 41, further comprising:
(a) sending a storage location identifier to a selected computer from the plurality of computers;
(b) performing virus checking on a selected file identified by the storage location identifier to generate virus status information for the selected file; and
(c) sending the virus status information for the selected file from the selected computer for inclusion in the virus database.

47. The method of claim 41, wherein performing virus checking in the plurality of computers includes performing virus checking in a selected computer from the plurality of computer by virus checking a plurality of files accessible by the selected computer.

48. An apparatus, comprising:
(a) a virus database configured to store virus status information for a plurality of files; and
(b) a first computer within which is resident a program configured to receive virus status information generated by a plurality of computers, the virus status information generated by each of the plurality of computers associated with at least one file accessible by the respective computer from the plurality of computers, the program further configured to store the virus status information for each file in the virus database, and to authenticate received virus status information prior to storing the received virus status information in the virus database.

49. The apparatus of claim 48, further comprising a plurality of computers in communication with the first computer, wherein at least a portion of the plurality of computers are configured to perform virus checking and send virus status information generated in response to virus checking.

50. The apparatus of claim 49, wherein plurality of computers includes a client computer configured to issue a search request, and receive and display a display representation of a portion of a result set generated in response to the search request.

51. The apparatus of claim 49, wherein the program is further configured to send a storage location identifier to a selected computer from the plurality of computers, and wherein the selected computer is configured to perform virus checking on a selected file identified by the storage location identifier to generate virus status information for the selected file, and to send the virus status information associated with the selected file from the selected computer for inclusion in the virus database.

52. A program product, comprising:
   (a) a program resident in a first computer and configured to receive virus status information generated by a plurality of computers, the virus status information generated by each of the plurality of computers associated with at least one file accessible by the respective computer from the plurality of computers, the program further configured to store the virus status information for the file in a virus database accessible by the first computer, and to authenticate received virus status information prior to storing the received virus status information in the virus database; and
   (b) a signal bearing medium bearing the program.

53. A computer-implemented method of building a virus database, the method comprising:
   (a) receiving with a first computer virus status information generated by a plurality of computers, the virus status information generated by each of the plurality of computers associated with at least one file accessible by the respective computer from the plurality of computers;
   (b) storing the virus status information for each file in a virus database accessible by the first computer;
   (c) sending a storage location identifier to a selected computer from the plurality of computers to initiate the performance of virus checking on a selected file identified by the storage location identifier to generate virus status information for the selected file; and
   (d) receiving the virus status information for the selected file from the selected computer for inclusion in the virus database.

54. A computer-implemented method of building a virus database, the method comprising:
   (a) receiving with a first computer virus status information generated by a plurality of client computers, the virus status information generated by each of the plurality of client computers associated with at least one file accessible by the respective client computer from the plurality of client computers, wherein each client computer is further configured to issue a search request via a web browser installed on such client computer, and to receive and display a display representation of a result set generated in response to the search request in the web browser;
   (b) storing the virus status information for each file in a virus database accessible by the first computer; and
   (c) authenticating received virus status information prior to storing the received virus status information in the virus database.

* * * * *